United States Patent

[11] 3,588,139

| [72] | Inventor | William Elbert Bayne<br>Independence, Mo. |
|---|---|---|
| [21] | Appl. No. | 805,679 |
| [22] | Filed | Mar. 10, 1969 |
| [45] | Patented | June 28, 1971 |
| [73] | Assignee | Clark Manufacturing Company<br>Atherton, Mo. |

[54] IMPLEMENT FOR APPLYING FERTILIZER
5 Claims, 4 Drawing Figs.

[52] U.S. Cl. .................................................. 280/43.22,
172/417, 172/484, 172/307, 280/411, 280/5
[51] Int. Cl. ........................................................ B62d 61/12
[50] Field of Search .......................................... 280/43.22,
43.23, 411, 461, 414.5; 172/417, 484, 307; 111/7

[56] References Cited
UNITED STATES PATENTS

| 2,152,212 | 3/1939 | Reinkens ..................... | 172/484X |
| 2,767,538 | 10/1956 | Scheidenhelm ............. | 280/43.23 |
| 2,968,356 | 1/1961 | Mydels ....................... | 172/417X |
| 3,106,970 | 10/1963 | Smith et al. ................. | 172/307X |
| 3,182,730 | 5/1965 | Murphy ....................... | 280/461(.1)X |
| 3,335,681 | 8/1967 | Main et al. .................. | 111/64 |
| 3,348,323 | 10/1967 | Purdy .......................... | 172/417X |

Primary Examiner—Leo Friaglia
Attorney—Schmidt, Johnson, Hovey and Williams

ABSTRACT: A fertilizer applying implement provided with separate frames for the ground-penetrating tools and the fertilizer tank respectively. Four-point linkage interconnecting the frames permits raising and lowering of the tools independently of the tank supporting frame to conserve the power requirements for operation of the implement.

PATENTED JUN 28 1971

INVENTOR
William Elbert Bayne

BY Schmidt, Johnson, Hovey,
Williams & Chase
ATTORNEYS

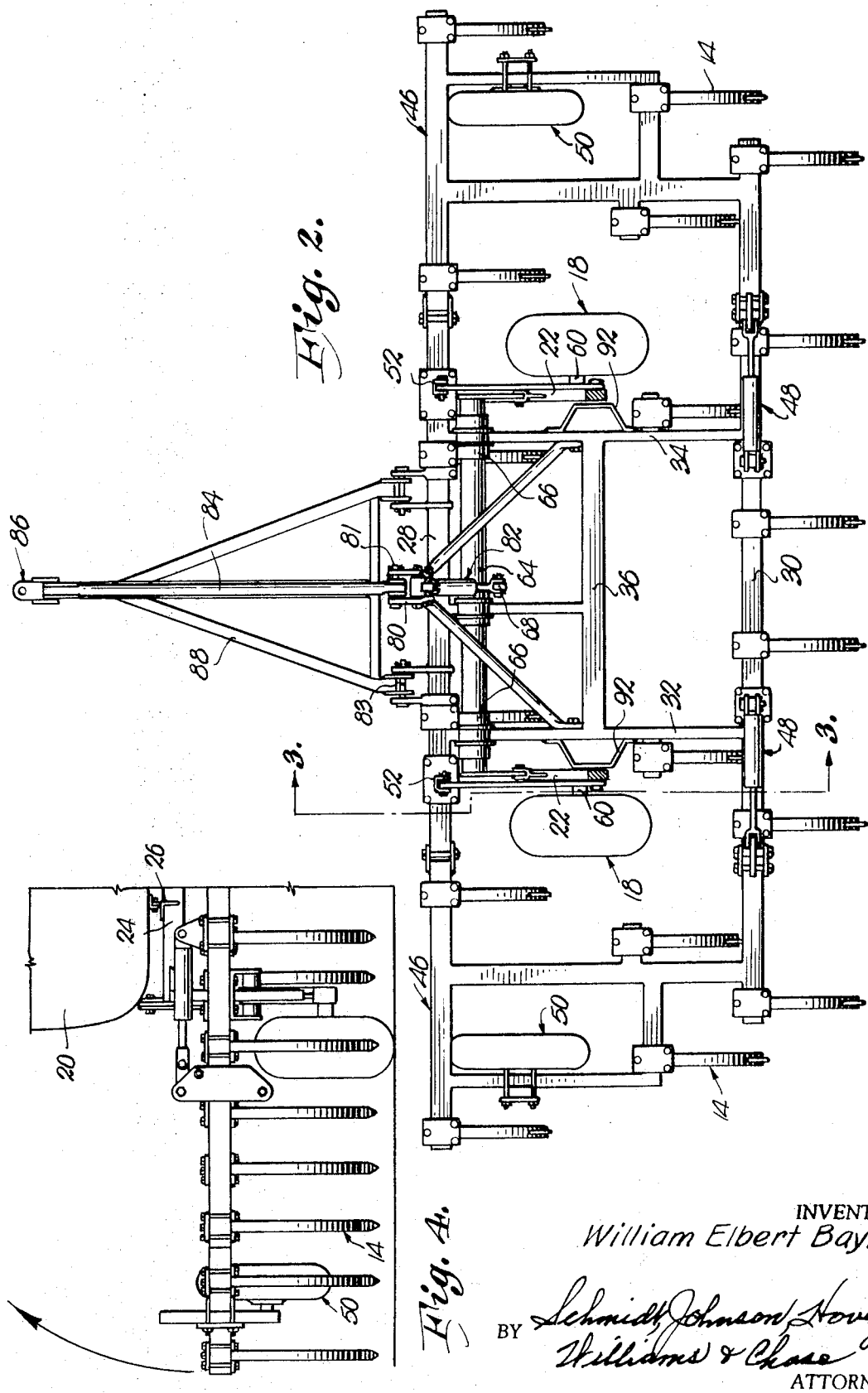

IMPLEMENT FOR APPLYING FERTILIZER

This invention relates to agricultural machinery, and more particularly to an implement for injecting liquid or gaseous fertilizer directly into the ground. Implements of this kind conventionally include a plurality of horizontally, spaced-apart ground-penetrating tools mounted on a frame. A tank containing a supply of pressurized fertilizer is carried by the implement. Heretofore, the tank and the tools have been mounted on a common frame.

The tools must be raised and lowered to permit turning of the implement at the ends of the field. Since the tank and its contents may be relatively heavy, it has heretofore been necessary to limit the size of the fertilizer storage tank to that which can be conveniently raised and lowered by the power system of the towing unit. This has either necessitated the use of a more powerful and, therefore, more expensive towing unit than would otherwise be required or, in the alternative, the use of a relatively smaller storage tank than desired. The latter resulted in frequent stops for refilling the tank, thereby decreasing the efficiency of the operation.

It is, therefore, an important object of this invention to provide a novel implement capable of carrying a maximum quantity of fertilizer without necessity for increased power capacity of the towing vehicle.

A further important object of this invention is to provide such an implement which virtually eliminates lifting of the fertilizer tank and which, therefore, minimizes the amount of work expended in application of the fertilizer to a field.

Another object of this invention is to provide a fertilizer applying implement constructed to permit ready installation or removal of a fluid piston and cylinder assembly so that the implement is easily adaptable for towing by a hitch or by three point suspension from the tractor.

Other objects and advantages of this invention will become apparent from the following specification, claims and accompanying drawings.

In the drawings:

FIG. 2 is a cross-sectional view taken along irregular line 2-2 of FIG. 1;

FIG. 4 is a fragmentary, rear elevational view of the implement showing one of the foldable frame extensions, the arrow indicating the direction of swing of the extension.

Figure 1:
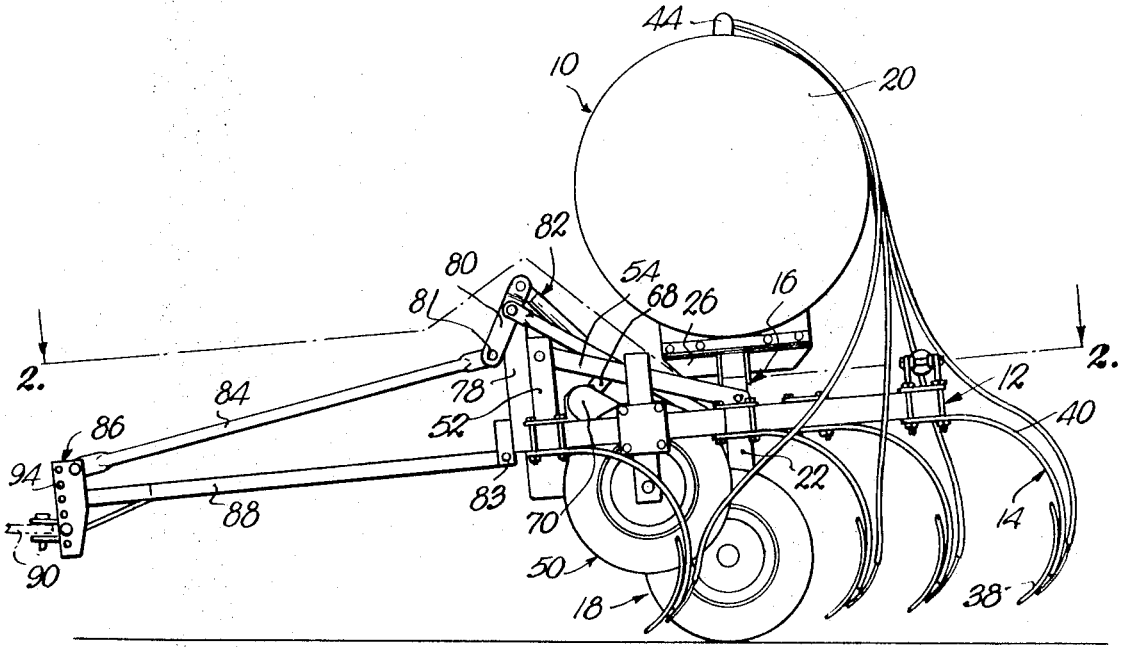
FIG. 1 is a side elevational view of an implement embodying the principles of this invention.
Figure 3:
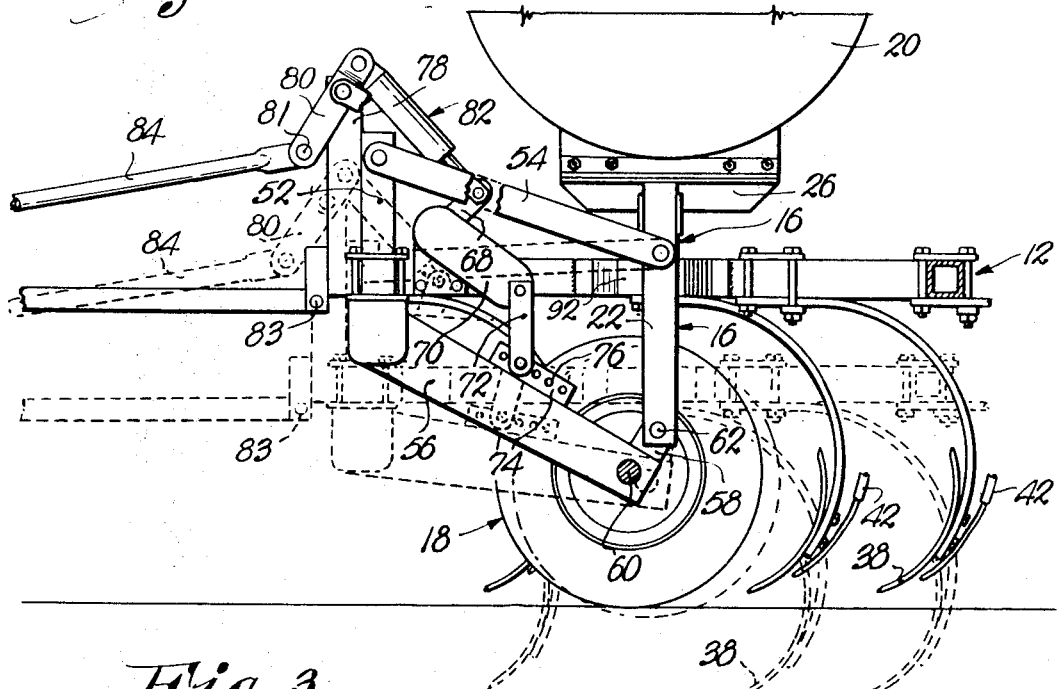
FIG. 3 is a cross-sectional view taken along line 3-3 of FIG. 2.

The implement for applying fertilizer is broadly designated by the reference numeral 10 and includes a generally horizontal frame 12 adapted to carry a plurality of soil-penetrating tools 14, a U-shaped secondary frame 16 having wheel and axle assemblies 18 for supporting the latter, and a fertilizer tank 20 mounted on frame 16 as illustrated best in FIGS. 1 and 3. Frame 16 includes a pair of generally upright, elongated, rigid members 22, there being a wheel and axle assembly 18 mounted at the lower end of each member 22 respectively. The members 22 are interconnected at their uppermost ends by a generally horizontally extending crosspiece 24 (FIG. 4). Brackets 26 are welded to crosspiece 24 and are secured to the lowermost portion of tank 20 for rigidly securing the tank to frame 16.

Frame 12 comprises front and rear, generally horizontally extending frame members 28 and 30 respectively. The members 28 and 30 are interconnected by fore-and-aft extending rigid frame members 32 and 34 as illustrated best in FIG. 2. An intermediate member 36 connects members 32 and 34.

The ground-penetrating tools 14 illustrated in the drawings may take any desirable form. However, the implement illustrated is in the nature of a spring-tooth cultivator. Accordingly, each tool 14 comprises a shovel 38 connected to frame 12 by an arcuate spring shank 40 which is rigidly secured to one of the frame members. Flexible conduits 42 extend from a metering pump 44 on tank 20 and are secured to each tool 14 behind its respective shovel 38 so that fertilizer may be conducted from tank 20 through conduits 42 for discharge immediately behind the corresponding tools 14.

It will be noted particularly in FIGS. 2 and 4 that frame 12 includes a pair of outboard frame extensions 46 pivotally secured to frame 12 at each side of the latter. Each extension 46 carries a plurality of ground-penetrating tools 14 which are provided with conduits in communication with tank 20 as has heretofore been described with respect to the tools carried by frame 12. The extensions may be swung about fore-and-aft extending, generally horizontal axes by power means 48 in the nature of piston and cylinder assemblies connected between the extensions and frame 12. Gauge wheels 50 carried by each extension 46 regulate the depth to which the tools may penetrate the ground.

Frame 12 includes a pair of spaced-apart, rigid uprights 52 which are secured to the front frame member 28 as illustrated in FIG. 2. Each upright 52 is pivotally coupled with one end of an elongated, rigid link 54. The opposite end of each link 54 is, in turn, pivotally coupled proximal the upper end of a corresponding member 22. In similar manner, the lowermost end of each upright 52 is pivotally coupled to one end of a rigid, elongated link 56, the other end of which is pivotally coupled to the lower end of a corresponding member 22 by means of a short lug 58 which is rigidly secured to link 56. It may be noted that, by inspecting FIG. 3, the axle 60 of each wheel and axle assembly 18 is carried by a corresponding link 56 and the axle is closely adjacent the point of pivotal movement 62 of link 56 with respect to its corresponding member 22.

The links 54 and 56 provide four-point linkage which interconnect frame 16 with frame 12 through the respective upwardly extending member 16 and uprights 52. Manifestly, there is identical four-point linkage at each side of implement 10. A horizontally extending shaft 64 is journaled on members 32 and 34 of frame 12 by bearings 66 carried by the respective members 32 and 34. An arm 68 extends radially outwardly from shaft 64 near the middle of the latter and is rigidly secured to shaft 64. Each end of shaft 64 has a crank 70 rigidly secured thereto and extending radially therefrom. Elongated, rigid elements 72 pivotally couple the outermost end of each crank 70 to a corresponding link 56 through bracket means 74 (FIG. 3). Bracket means 74 are each provided with a longitudinally extending series of holes 76 so that the coupling of crank 70 to its link 56 may be adjusted longitudinally along the latter.

A standard 78 is rigidly secured to the front frame member 28 and extends upwardly therefrom. An elongated, rigid element 80 is rigidly secured intermediate its ends to the upper end of standard 78. One end of element 80 is pivotally coupled to power means 82 in the nature of a piston and cylinder assembly. The other end of the assembly is pivotally coupled to arm 68 on shaft 64. The opposite end of element 80 is releasably secured by bolt means 81 to an elongated, rigid connector 84. The latter is, in turn, attached to the hitch 86 mounted on the front end of a tongue 88 which is releasably coupled to frame 12 by bolt means 83.

In operation, the assembly 82 is operably coupled with the hydraulic power system of the towing vehicle, the drawbar 90 of which appears in FIG. 1. Similarly, the assemblies 48 are also placed in fluid communication with the hydraulic power system. The operator of the towing vehicle may operate the respective fluid piston and cylinder assemblies 48 to swing the frame extensions into the normal operating positions thereof shown in FIGS. 2 and 4. Assembly 82 is extended to cause clockwise rotation of shaft 64 as viewed in FIG. 3. This moves frame 12 to the position thereof illustrated in dash lines in FIG. 3 by causing the lowering of the uprights 52. The four-point linkage interconnecting frame 16 with frame 12 insures that frame 12 remain substantially horizontal during its movement between its upper and lower positions. Outwardly extending bumpers 92 are rigidly secured to each of the frame members 32 and 34 (FIG. 2) to maintain frame 12 in its proper relationship with respect to the members 22 at all times. It will be understood of course, that the bumpers 92 are free to slide along the innermost surfaces of the respective members 22 during the raising and lowering of frame 12 with respect to frame 16.

When it is necessary to raise the ground-penetrating tools from the ground to permit the turning of the implement at the end of a field, assembly 82 is operated to rotate shaft 64 in the counterclockwise direction as viewed in FIG. 3. This results in the lifting of uprights 52 which, in turn, lifts frame 12 to the full-line position thereof illustrated in FIG. 3.

It should be observed that the lifting of frame 12 is carried out without the necessity of lifting tank 20 a corresponding distance. Actually, with the arrangement illustrated, including the four-point linkage interconnecting the frames, the position of tank 20 remains virtually constant throughout the range of movement of frame 12. The slight offset relationship between axle 60 and pivot point 62 will inherently result in a very slight amount of lifting of tank 20 when frame 12 is lowered. It will be recognized, of course, that the weight of frame 12 during the lowering of the latter compensates for the slight lifting of the tank. Similarly, the weight of tank 20 may slightly assist in overcoming the force of gravity during the lifting of frame 12.

Manifestly, the swingable extensions 46 permit folding of implement 10 for over-the-road travel. It is but a simple operation with assemblies 48 to swing the extensions from their normal operating positions to their vertically extending, traveling positions. The depth of engagement of the tools 14 into the ground and consequently the distance through which they are raised when frame 12 is raised, may be varied by adjusting the position of elements 72 with respect to their corresponding links 56. The height at which tongue 88 is carried may also be adjusted in a conventional manner by means of the upwardly extending series of openings 94 in hitch 86.

The importance of the construction of implement 10 with standard 78 extending upwardly from frame 12 at the front of the latter should not be overlooked. This placement of standard 78 renders the fluid piston and cylinder assembly 82 conveniently accessible for ready installation and removal without need for the operator to crawl down under the implement.

It is common practice for a farmer or equipment operator to use one power cylinder assembly for a number of different implements by transferring the assembly from one implement to another. Location of the assembly in close proximity to the towing tractor to minimize length of pressure hose is also important. Further, an implement such as implement 10 may either be used with a hitch as shown or, if the tractor is equipped with hydraulically operated, three-point suspension means, the hitch may be removed and such means may be attached by bolt means 81 and 83 directly to frame 12.

Presently available implements of this general type either have the power cylinder assembly mounted at the rear of the implement or mounted substantially horizontally beneath the main frame of the implement. In the first case, extremely long pressure hoses are necessary to conduct fluid from the tractor to the assembly. In the second case, the assembly is extremely difficult to reach for removal or installation. The construction of implement 10 utilizes the upwardly extending standard 78 to eliminate both of these disadvantages.

Having thus described the invention, what is claimed as new and desired to be secured by Letters Patent is:

I claim:
1. In a vehicle:
a pair of wheel-supported frames,
one of the frames being generally horizontal and having a pair of spaced uprights,
the other of said frames having a pair of spaced, generally vertical members;
four-point linkage pivotally connecting each upright respectively with a corresponding member for up and down movement of the one frame relative to the other frame;
a rotatable element carried by said one frame;
structure coupling the element with said linkage for raising and lowering the one frame upon rotation of the element;
power means interconnecting the one frame and said element for rotating the latter; and
a pair of wheel and axle assemblies, the axle of each assembly pivotally receiving one corresponding link of said linkage.
2. The invention of claim 1,
said structure including a pair of cranks rigid to said element for rotation therewith, and means pivotally coupling the cranks with said linkage.
3. The invention of claim 1,
said element having an arm rigid thereto for rotation therewith,
said power means comprising a fluid piston and cylinder assembly pivotally interconnecting said one frame and said arm.
4. The invention of claim 3,
said one frame having an upwardly extending standard rigid thereto,
said standard being disposed proximal the front of said vehicle,
said power means being pivotally connected to said standard.
5. The invention of claim 1, and removable hitch means releasably secured to one of said frames.